US006630022B2

(12) United States Patent
Lessard et al.

(10) Patent No.: US 6,630,022 B2
(45) Date of Patent: *Oct. 7, 2003

(54) MECHANICAL ACTIVATION OF GRANITIC POWDERS

(75) Inventors: Paul C. Lessard, Oakland, CA (US); Michael Havens-Cook, San Juan Bautista, CA (US)

(73) Assignee: Granite Rock Company, Watsonville, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,471

(22) Filed: May 12, 1999

(65) Prior Publication Data

US 2003/0131764 A1 Jul. 17, 2003

(51) Int. Cl.$^7$ .............................. C04B 14/04; C04B 7/13
(52) U.S. Cl. ................... 106/817; 106/401; 106/417; 106/461; 106/482; 106/483; 106/484; 106/737; 106/738; 106/801; 106/814; 106/816; 106/819; 106/638
(58) Field of Search ................... 106/638, 817, 106/737, 738, 801, 814, 401, 417, 461, 482, 483, 484, 816, 819

(56) References Cited

U.S. PATENT DOCUMENTS

| | | | |
|---|---|---|---|
| 4,188,233 A | 2/1980 | Juhasz et al. | 106/716 |
| 4,979,686 A | 12/1990 | Szegvari et al. | 241/172 |
| 5,383,967 A | 1/1995 | Chase | 106/737 |
| 5,554,352 A | 9/1996 | Jaques et al. | 106/737 |
| 5,695,130 A | * 12/1997 | Csendes | 241/19 |
| 6,068,803 A | * 5/2000 | Weyand et al. | 264/82 |

FOREIGN PATENT DOCUMENTS

WO       98/24733    *  6/1998

OTHER PUBLICATIONS

C.C. Koch, "Materials Synthesis By Mechanical Alloying", *JIP* (1989) *Annu. Rev. Mater. Sci., 19*:121–43 (no month).
P.G. McCormick and F.H. Froes, "*The Fundamentals of Mechanochemical Processing*" (Nov. 1998):61–65.
W.R. Hudson, D. Little, A.M. Razmi, V. Anderson, and A. Weissmann, "An Investigation of The Status of By–Product Fines in The United States", *ICAR* (Jan. 1998), *Research Report* ICAR–101–1.
A.W. Weeber and H. Bakker, "Amorphization By Ball Milling. A Review", *Elsevier Science Publishers B.V.* (1988) Physica B 153: 93–135 (no month).
C.C. Koch, O.B. Cabin, C.G. McKamey and J.O. Scarbrough, "Preparation of "amorphous" $Ni_{60}Nb_{40}$ by Mechanical Alloying", AIP (Dec. 1, 1983), *Appl. Phys. Let.* 43(11):1017.

ASTM Committee C–9, "Standard Specification for Fly Ash and Raw or Calcined Natural Pozzolan for Use as a Mineral Admixture in Portland Cement Concrete", *Designation* C 618–9 (Jun., 1991):303–305; and *Designation: C 311–97* (Mar., 1997): 184–85, and C 311:188–191.
ASTM Committee C–1, "Standard Test Method for Compressive Strength of Hydraulic Cement Mortars (Using 2–in. or [50–mm] Cube Specimens)1", *Designation: C 109–C 109M—95* (Jul., 1995):68–72.
W. Jiang and D.M. Roy, "Strengthening Mechanisms of High Performance Concrete" (1994), SP 149–42, pp. 753–767 (no month).
D.M. Roy, B.E. Scheetz and M.R. Silsbee, "Processing of Optimized Cements and Concretes via Particle Packing," *MRS Bulletin* (Mar. 1993), pp. 45–49.
Per Goltermann, Vagn Johansen and Lars Palbøl, "Packing of Aggregates: An alternative Tool to Determine the Optimal Aggregate Mix," *ACI Materials Journal* (Sep.–Oct. 1977), Title No. 94–M51, pp. 435–443.
V.V. Boldyrev, Reactivity of Solids and New Technologies, *Reactivity of Solids: Past, Present and Future*, International Union of Pure and Applied Chemistry, Blackwell Science (V.V. Boldyrev, ed.), pp. 267–285. (no date).
Gerhard Heinicke, *Tribochemistry*, Carl Hanser Verlag, Münich (1984), pp. 5–10, 387–390, 400, 418, 469. (no month).
K. Tkáčová, *Mechanical Activation of Minerals*, Elsevier Science S.A., Amsterdam (1989), pp. 136–138. (no month).
E. Mendelovici, "Solid–State Transformation Mechanisms of Associated Minerals to Aluminosilicates," *J. Thermal Anal.* (1997), 48:141–44. (no month).
Zheng Yi Fu and Shi Liu Wei, "Mechanochemical Activation of Calcium Oxide Powder," *Powder Technology 87*, Elsevier Science S.A. (1996), pp. 249–254. (no month).
A.N. Scian and E. Pereira, "Mechanochemical Activation of High Alumina Cements—Hydration and Thermomechanic Behaviour II.," *Cement and Concrete Research* (1994), Elsevier Science Ltd., 24(5):937–47. (no month).
Qiwu Zhang, Eiki Kasai, Fumio Saito, "Mechanochemical Changes in Gypsum When Dry Ground with Hydrated Minerals," *Powder Technology 87*, Elsevier Science S.A. (1996), pp. 67–71. (no month).

* cited by examiner

*Primary Examiner*—Anthony J. Green
(74) *Attorney, Agent, or Firm*—Townsend and Townsend and Crew LLP

(57) ABSTRACT

A mechanically activated pozzolan prepared from granitic quarry fines. Quarry fines are milled by a high-energy milling process to convert the essentially inert raw granitic fines into a chemically reactive state. When added to a portland cement mortar mixture, mechanically activated fines combined with calcium hydroxide to improve the strength of the cured mortar compared to a similar mixture prepared with raw fines. Mortars prepared with mechanically activated granitic fines typically show strength values comparable to or exceeding similar mortars made using fly ash as a pozzolan. In some instances, the strength of a mortar prepared with mechanically activated granitic quarry fines exceeded a mortar prepared using 100% portland cement as the cementitious component.

26 Claims, 7 Drawing Sheets

MECHANICAL ACTIVATION OF GRANITIC POWDERS

BACKGROUND OF THE INVENTION

This invention relates generally to reactive binding material for use with cementitious building materials, and more specifically to the mechanical activation of granitic quarry fines into a pozzolan-type material.

The stockpiling and disposal of fines produced from aggregate quarrying and crushing operations is one of the major problems now facing the United States' aggregate industry. (International Center for Aggregates Research, "An Investigation of the Status of By-Product Fines in the United States," Research Report ICAR 101-1, 1997.) To date, research has generally focused on developing techniques for adding fines as a non-reactive filler to concrete and asphalt products. Other limited studies have evaluated fines for use as soil admixtures and amendments, mineral fillers, or for use as flowable fill material. Unfortunately, none of these applications has been particularly successful, and so these waste fines must be handled, stockpiled, and ultimately stored—consuming large quantities of energy and real estate, without benefit to the quarry operator or to the public.

Little research, however, has been devoted to chemically changing the quarry fines to alter their reactive characteristics. "Mechanochemical processing" uses mechanical energy to activate or accelerate chemical reactions and/or cause changes in chemical structure. Most research today is performed in the area of bimolecular "mechanically alloying" where the goal is to produce new or novel microstructures with enhanced mechanical properties from two or more starting materials. In unimolecular reaction systems, most of the research in mechanical activation has been done on single-phase material, such as silica sand, rather than on multi-mineral systems, such as granite. Interestingly, a recent review article (P. G. McCormich and F. H. Froes, "The Fundamentals of Mechanochemical Processing," *J. of Materials* (November 1998), p. 61) mentions that the application of mechanochemical methods to waste processing "has not yet received much attention, but is an area worthy of exploration."

The construction industry uses a wide variety and large quantity of mineral-based materials in the manufacture of concrete structures, precast concrete products, mortars, and similar products. Processes used to create such mineral-based building materials vary from relatively complex to quite simple. For example, the manufacture of portland cement includes mining and crushing limestone, mixing in other minerals, calcining the limestone mixture in a kiln to form clinker, and then mixing the clinker with gypsum before grinding it into cement. In contrast, producing aggregate for use in concrete or as a road base is less complicated—rocks are typically quarried, crushed, and sieved to sort the desired size(s) of aggregate from the crushed rock. Another simple process is the mining of clean sand for use as a filler in mortar or concrete.

Because building materials and components for building materials typically are relatively heavy and located in different geographical locations, transporting the materials to a worksite can be expensive. An example of a material where transportation costs significantly impact use is fly ash. Fly ash, a type of pozzolan, is a byproduct of coal-burning power plants, and can be used as a reactive, cementitious material in the production of hydraulic cement. A typical cement mixture may have up to 20% of the portland cement content replaced by fly ash. Under certain circumstances, using fly ash instead of portland cement results in a more economical and durable concrete mix. Fly ash is relatively inexpensive at the power plant source, presently costing only about $3–4 per ton. This compares to about $80–90 per ton for the portland cement which the fly ash replaces in the concrete. Transporting fly ash from the Midwest, where it is often produced, to the West, where there is a demand for its use, increases the cost of the fly ash to about $40–50 per ton. Therefore, it would be desirable to provide a fly ash substitute that can be produced closer to the point of use and provides adequate strength in a concrete or mortar mixture.

A method is presented here to increase the reactivity of quarry fines by changing their chemical state utilizing a mechanical process, enabling their use as a partial replacement for portland cement.

SUMMARY OF THE INVENTION

Granitic quarry fines that would otherwise be a waste byproduct of a quarry operation can be mechanically activated to become a cementitious or reactive component of concrete and/or similar materials including ceramics and/or polymers. The fines are milled, typically by a high-energy milling process such as in an attritor mill, to convert the fines from an essentially non-reactive state into a reactive state. Like fly ash pozzolans, the granitic-based pozzolan chemically combines with calcium from the hydration of portland cement, when the pozzolan and cement are mixed with water and cured. The use of a suitable mill, such as an attritor mill, results in a pozzolan which has mechanically activated particles. The effectiveness of the mechanical activation can be determined by compressive strength measurements. Generally, the process provides a pozzolan which has mechanically activated particles, wherein particles having a maximum dimension of about 10 microns in the sample population and contain numerous macroparticles formed from an agglomeration of microparticles. The pozzolan, like fly ash, reacts with lime (calcium hydroxide) to form hydrated calcium silicate product. In another embodiment the invention provides a cement-based material which includes a portland cement paste hydrating in concert with activated granitic-based pozzolan.

DESCRIPTION OF THE SPECIFIC EMBODIMENTS

Figure 1:
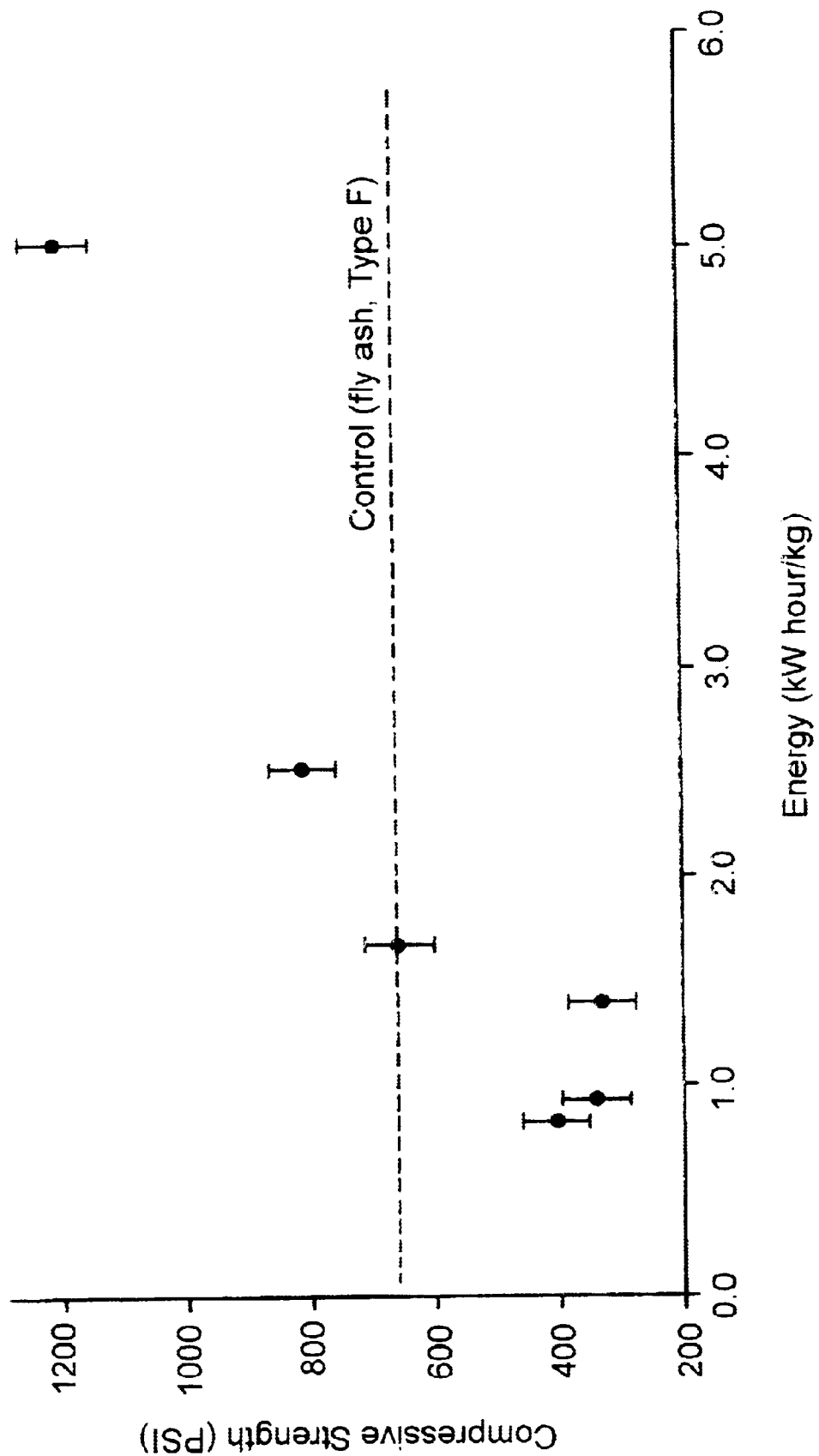
FIG. 1 is a chart showing compressive strength versus milling energy for lime mortar samples containing milled granitic fines.

The present invention relates to the mechanical conversion of quarry fines to a pozzolanic material. In particular, granitic-type quarry fines produced in the manufacture of aggregate (crushed rock) can be activated to become a binding agent in a hydraulic cement by high-energy milling. Herein, the terms "granite" or "granitic" are used interchangeably and intended to include not only granite, but similar igneous rocks, such as gabbro and diorite, among others. In general, these materials are coarse-grained igneous rocks that include a number of mineral phases. Mineral phases typical of granitic-type rocks include quartz, feldspar, calcite, hornblende, plagioclase, pyroxene, and mica, as well as other components, such as laumontite or chlorite. Those skilled in the art understand that the relative amounts of mineral phases depend on the type of rock being quarried, and that not all granitic-type rocks are composed of the same mineral phases in the same proportions.

Granite is used as an aggregate in the construction industry, as well as for other purposes, such as countertops and tiles. The manufacture of aggregate from quarried granite produces a large amount of "fines" that result from the crushing and handling processes of the rock. Fines are basically dust that is washed or screened from the aggregate or sand produced in the crushing and sieving process. Typically, fines will pass through a 200 sieve, although the exact size of the fines is not critical, as will be discussed below. A single quarry can produce hundreds of thousands of tons of fines per year. Nationwide, it is estimated that about 100,000,000 tons of quarry fines are produced annually. Currently, only about 25% is used, for example, as filler or soil amendments, and the remainder is typically stockpiled on-site. The stockpiling and disposal of fines produced as a result of aggregate crushing and production operations is considered one of the major problems facing the United States' aggregate industry today. The resulting 75,000,000 tons per year of unusable, unmarketable fines typically cost from $2 to $4 per ton to manage, handle, and ultimately store. International Center for Aggregates Research, id.

The American Society of Testing Materials ("ASTM") C618-91 defines "pozzolans" as "siliceous or silicious and aluminous materials which in themselves possess little or no cementitious value but will, in finely divided form and in the presence of moisture, chemically react with calcium hydroxide at ordinary temperatures to form compounds possessing cementitious properties." This standard classifies pozzolans as Class N, F, and C, where F and C refer to fly ash-type pozzolans and Class N is defined as a "raw or calcined natural" pozzolan. Although the activated granitic material described here does not formally fit into these ASTM classifications, it clearly performs in accordance with the chemical reaction requirement described by ASTM for pozzolans.

A technique for converting quarry fines into a useful cementitious product has been found. Furthermore, the activated fines are produced concurrently with the aggregate. Therefore, if the fines are converted on-site, shipping of these materials between sites is not necessary. High-energy milling techniques are used to mechanically activate the fines. These techniques convert the fines from non-reactive filler to a cementitious binder that is chemically active in a hydraulic cement mixture.

Various high-energy mills can be used to mechanically activate minerals or other materials, according to this invention. This process is known as mechanochemical processing or "reaction milling." Examples of high-energy mills include jet mills, vortex mills, disintegrator mills, electromass classifiers and attritor mills, among others. An attritor mill, for example, uses agitator arms rotating at high speed (800–1500 rpm) within a milling vessel to impart kinetic energy to milling media, such as stainless steel, tool steel, or tungsten carbide balls, which in turn impact the mill grist, in this instance granitic fines. UNION PROCESS, INC. of Akron, Ohio is a company that manufactures and sells attritor mills.

The exact mechanism of the mechanical activation of granitic fines is not known, but various theories exist for the activation of non-granitic products. See, for example, C. C. Koch, et al., *Appl. Phys. Lett.*, 43 (1983), p. 1017; A. W. Weeber and H. Bakker, *Physica B*, 153 (1988), p. 93; and C. C. Koch, *Annl. Rev. Matl. Sci.*, 19 (1989), p. 121. As discussed by Koch, it has been shown that the high energy milling process reduces the crystalline order by increasing the dislocation density or even by converting the particle to an amorphous state. We suspect that this disorder increases the chemical activity of the particle, making it reactive where it otherwise would be essentially non-reactive.

Reaction With Lime

Samples of milled quarry fines were evaluated using the ASTM C 593-95 "Standard Specification for Fly Ash and Other Pozzolans for Use with Lime." This test indicates the extent of hydrated calcium silicate formation from the reaction of lime (calcium hydroxide) with pozzolan and water. The control sample for this test was made using fly ash from POZZOLANIC INTERNATIONAL from the JIM BRIDGER PLANT in Rock Springs, Wyo. as a reactive siliceous component. In this test, cubes approximately 2 inches by 2 inches are tested for compressive strength testing after seven days of storage at 130° F.±3° F. When milled fines were combined with lime, water, and sand, samples exceeding the minimum compressive strength requirement of 600 PSI (ASTM 593-95) were observed (FIG. 1). One of the samples prepared with mechanically activated granitic fines provided almost twice the compressive strength of a sample made from commercially available fly ash.

Partial Cement Replacement Test Cubes

Partial cement-replacement tests were performed according to the ASTM C 109 and C 618-91. In these tests, mortar samples were prepared using 100% portland cement (control), and mechanically activated quarry fines substituting for 20% of the portland cement (test). The cement in all tests was Type I/II obtained from KAISER CEMENT in Cupertino, Calif. Specimen preparation and analysis is similar to the lime cube test, except the samples must cure 28 days at ambient temperature before compressive testing.

Processed samples were typically screened by performing a C618 test with constant water cement ratios (w/c). If data from these tests indicated transformation of the granitic fines from a non-reactive to a reactive state, samples were prepared by adjusting w/c ratio for equal flows. The flow of the mixture was determined using the standard ball-pancake drop test (ASTM C 109). Normally, material that was not activated gave compressive strength in cement replacement cubes that was about 70% of the 100% cement control, while activated material produced cube strength that was 90 to 110% or more of the cement control. Furthermore, several samples prepared with mechanically activated granitic fines milled by various milling vendors using various mills and milling procedures equaled or exceeded the strength of cement cubes using fly ash as a pozzolan.

Typical compressive strength after 28 days for the 100% cement cubes was around 5300 PSI. Results for cubes made with 20% mechanically activated granitic fines substituted for cement ranged considerably depending on milling duration, but included strengths of up to about 5700 PSI, which exceeded the strength of the control cube for that set of samples. The strength of a cement cube with 20% raw fines (unmilled) substituting for cement had a compressive strength of only about 3800 PSI.

Figure 2:
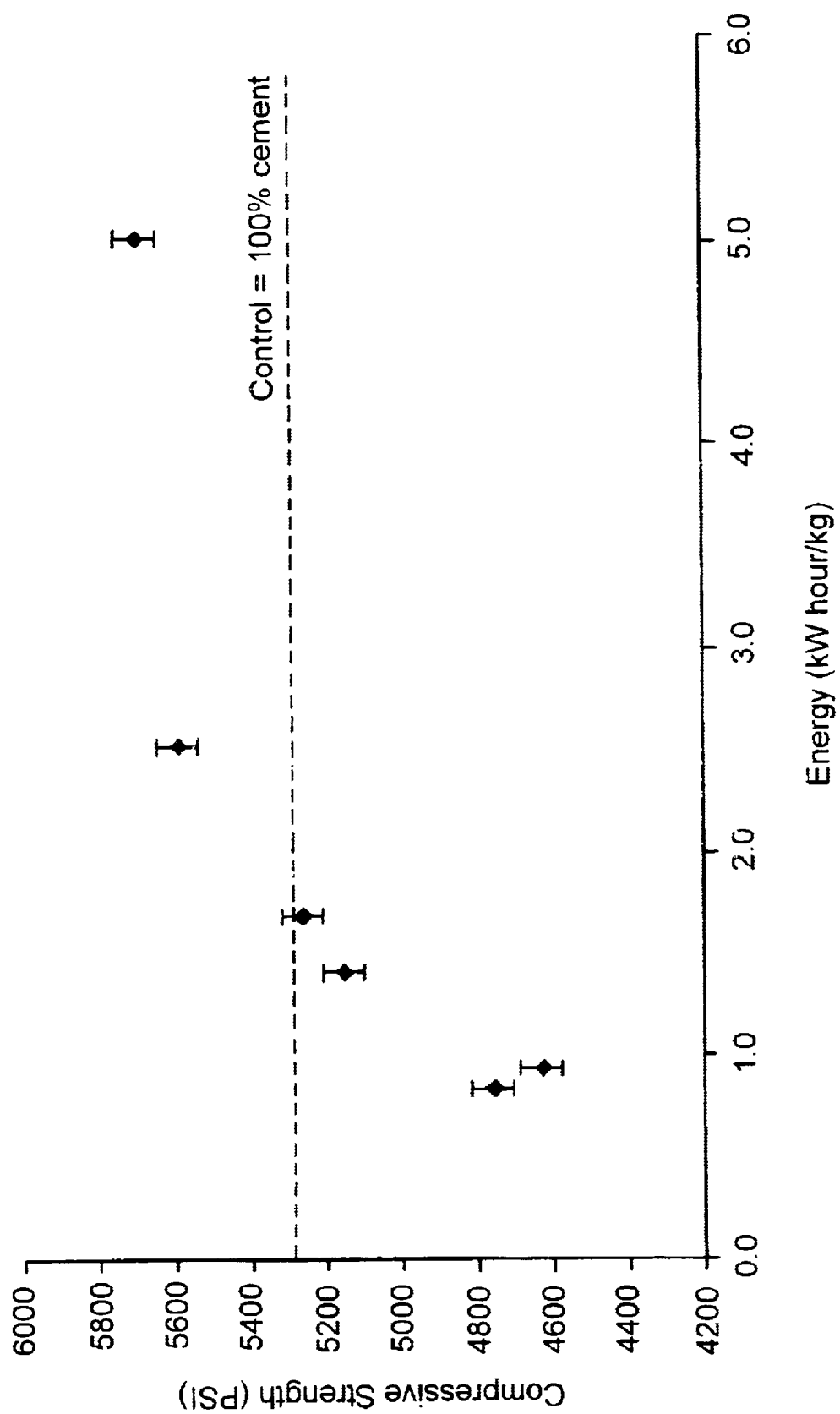
FIG. 2 is a chart showing compressive strength versus milling energy for concrete samples containing milled granitic fines.

FIG. 2 is a graph showing the compressive strength of a series of mortar cubes with 20% substitution of mechanically activated granitic fines versus the energy applied to the fines in the milling process. The dashed line represents the strength of a control cube using 100% cement. Samples having a compressive strength greater than 5,320 PSI exceed the strength of the standard concrete mortar mix. Although only two data points are shown above the line, this result has been duplicated under different milling conditions. According to the ASTM C 618 specification, an acceptable pozzolan must produce concrete that is at least 75% as strong as the control and must chemically react in the presence of moisture with calcium hydroxide at ordinary temperatures. In this case, that would be 3,990 PSI, which all samples in this group meet, thus making any of these samples acceptable for building material.

Milling Parameters and Particle Size Data

Milled fines from the same source processed in the same mill for different periods of time were analyzed for particle size, strength, and degree of activation. FIGS. 1 and 2 show the degree of activation of fines from the A. R. Wilson Quarry in Aromas, Calif., that were prepared by the Special Research Center for the Advanced Mineral and Materials Processing of the University of Western Australia. Similar results have been obtained using a three-horsepower Union Process HSA-1 attritor mill. Typically, one kilogram of process material (fines) is added to 10 kilograms of ⅛ inch stainless steel media and operated at about 1000 RPM for periods up to 60 minutes.

Figure 3:
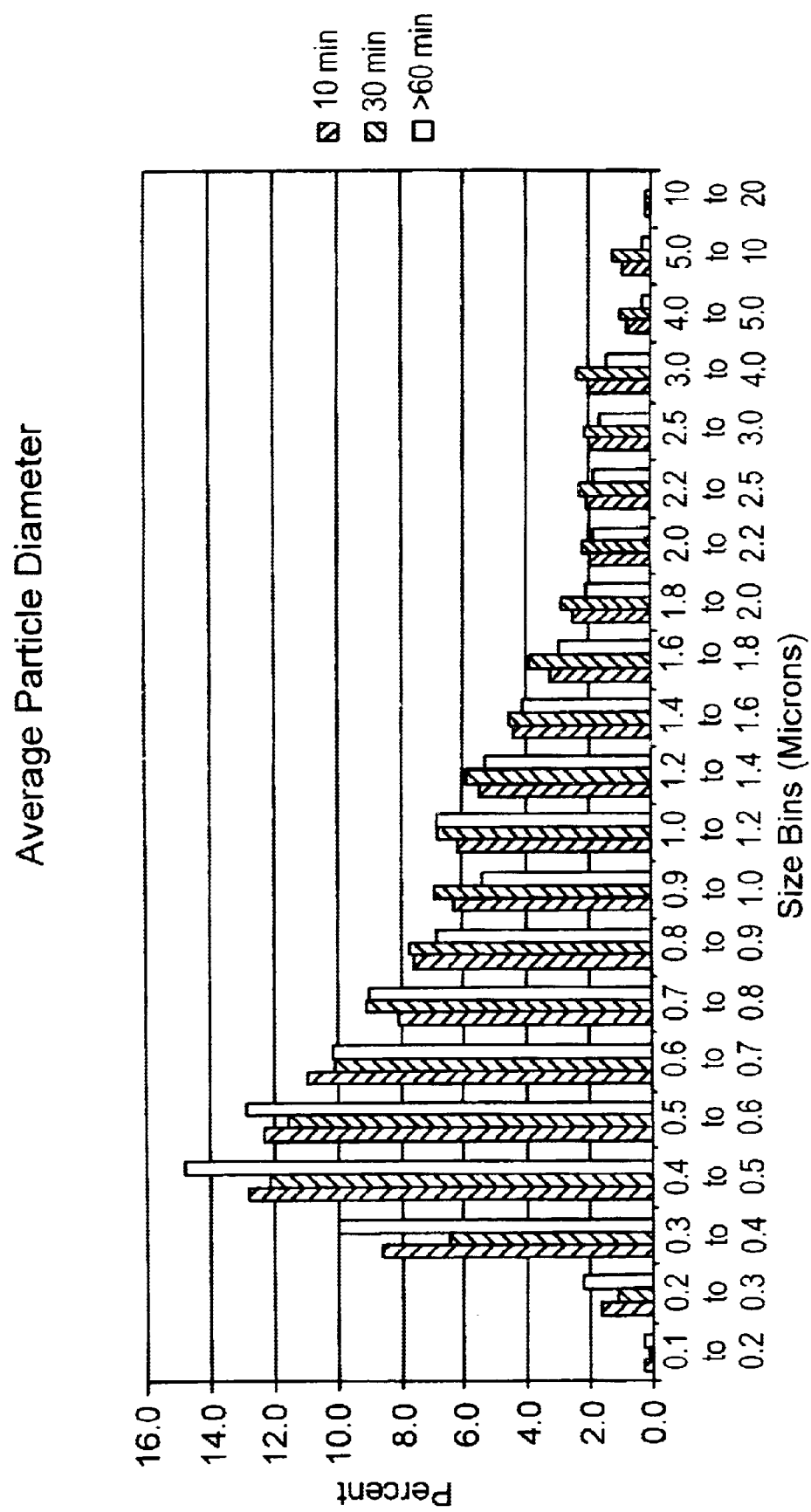
FIG. 3 is a chart showing the particle size distribution for quarry fines after various milling times.

Particle size was measured using computer-controlled scanning electron microscopy (CCSEM) and a laser diffraction particle size analyzer. The results shown in FIG. 3 are from the CCSEM measurements. In all three samples, over 80% of the particles were between 0.2–1.0 microns. Particle size appeared to initially decrease with milling time, and then to increase. It is believed that the particle size decrease corresponds to a "fracture" stage, while the particle size increase corresponds to a "welding" or fusing stage, similar to what has been observed in mechanical alloying systems. L. Lu and M. O. Lai, "Mechanical Alloying," Kluwer Academic Publishers, Norwell, Mass., 1998. The agglomerated particle that results is clearly seen in FIG. 5.

The table below summarizes elemental composition of the starting material after 10 minutes and 60 minutes as measured by CCSEM equipped with energy dispersive spectra (EDS) analysis. The mass ratios of the Ca/Mg/Si/Al phase to a Ca/Si/Al phase are given. This suggests that mechanical activation of granitic fines creates a new material rich in magnesium which may in part promote the diffusion of calcium into the pozzolanic grain during hydration of the pozzolan.

| Comparison of the Ca/Mg/Si/Al:Ca/Si/Al Ratios in Milled Granitic Powders | | |
|---|---|---|
| Analysis Type Composition by mass | 10 minutes mill time 28:22 | 60 minutes mill time 73:7 |

SEM/EDS of Milled Powder Samples

Figure 4:
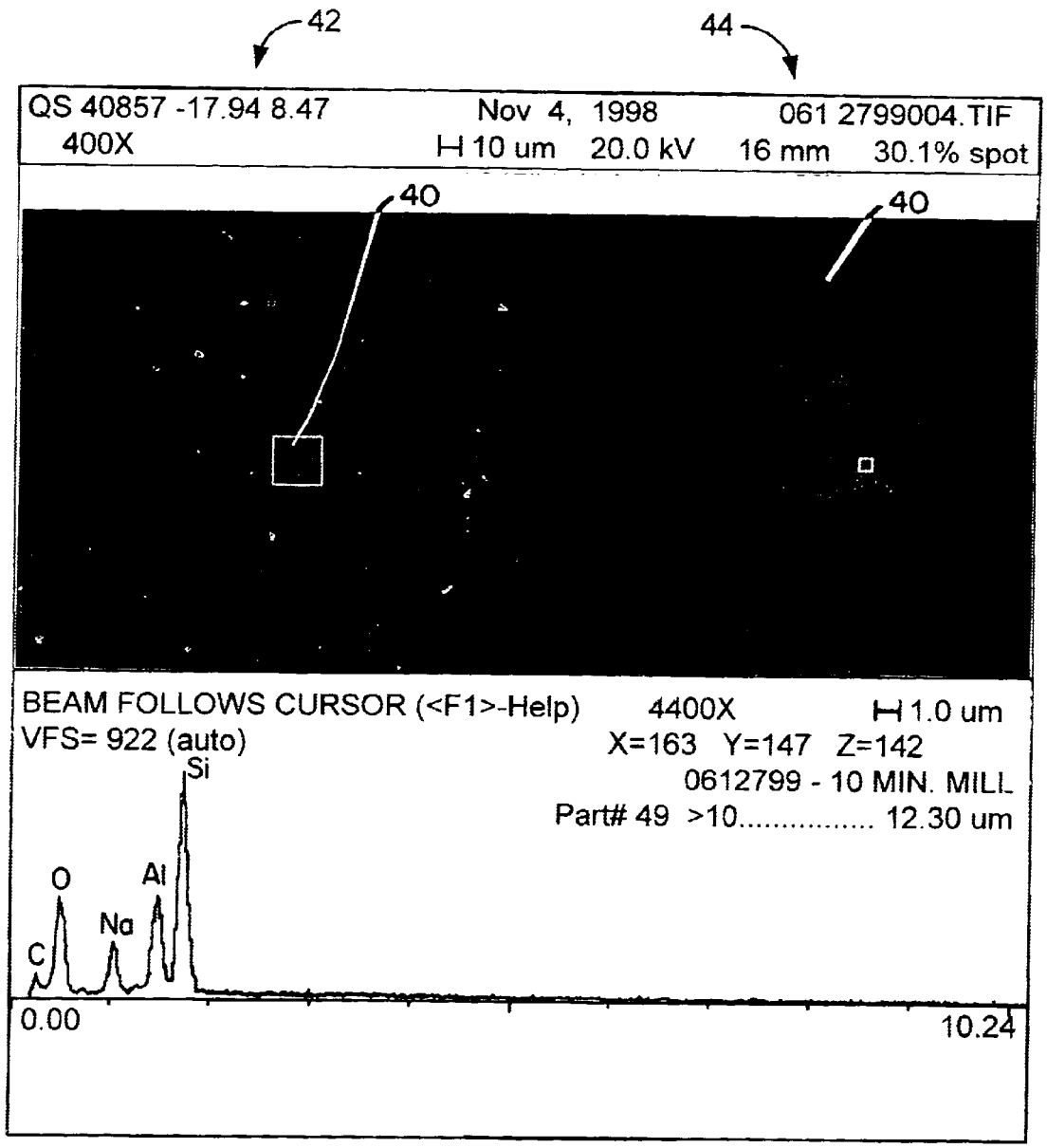
FIG. 4 is a set of scanning electron micrographs and an energy dispersive spectrum of a particle of quarry fines after ten minutes of milling.

FIG. 4 is set of a scanning electron micrographs ("SEMs") of a particle 40 in fines milled for 10 minutes at a magnification of 400X 42, and at a magnification of 4,400X 44, in addition to an EDS 46 of the particle. The EDS identifies atomic elements present in the area defined by the target square 48. The particle is about 10 microns across.

Figure 5:
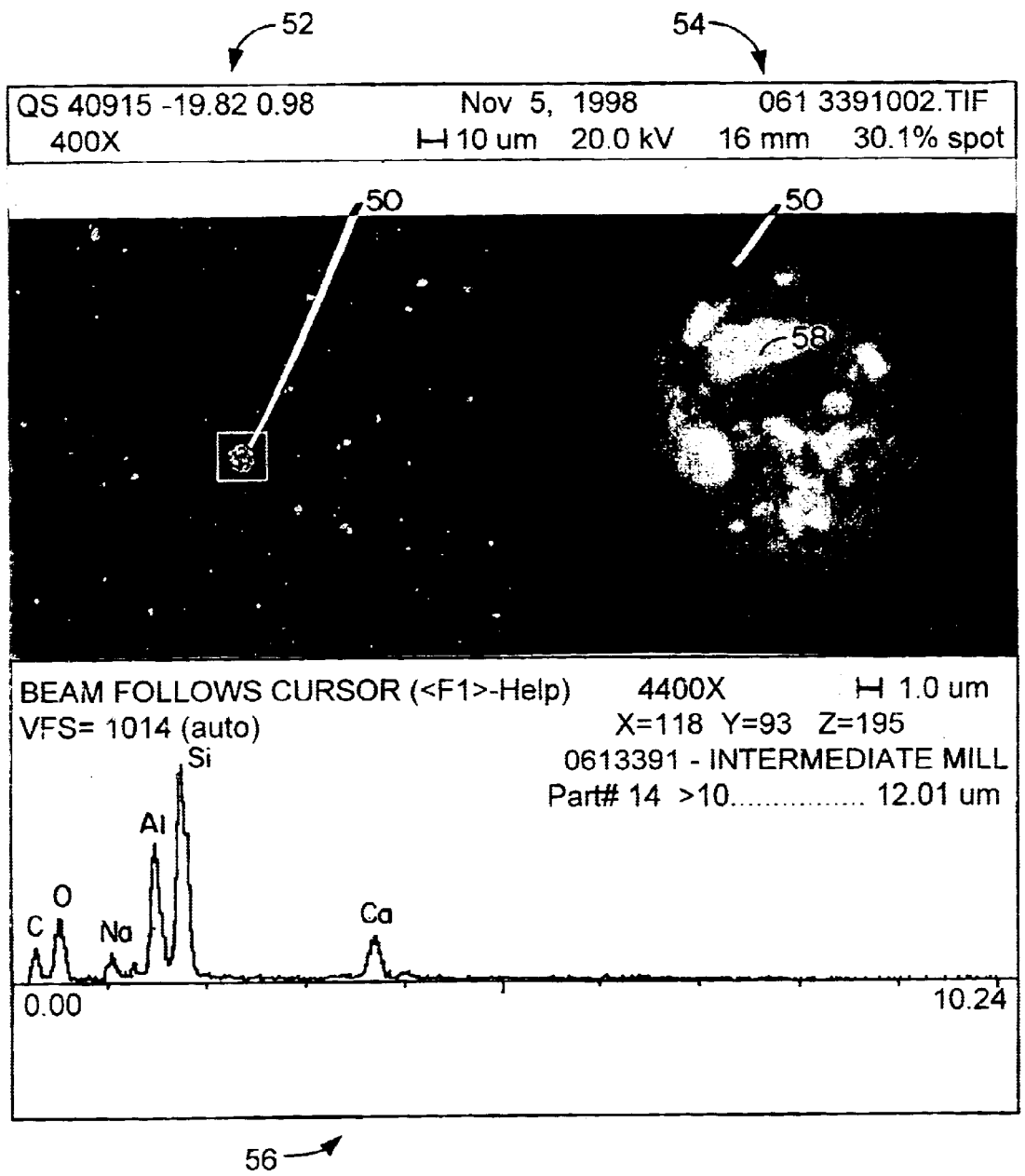
FIG. 5 is a set of scanning electron micrographs and an energy dispersive spectrum of a particle of quarry fines after sixty minutes of milling.

FIG. 5 is a similar set of SEMs of a particle 50, also about 10 microns across, in fines milled for approximately 60 minutes at magnifications of 400X 52 and 4,400X 54, in addition to and EDS spectra 56 of the showing the atomic elements present in the target square 58. Comparing FIG. 5 to FIG. 3, it is seen that even though the particles are nominally the same size, the particle present after 60 minutes of milling is a "macroparticle" composed of several "microparticles." It is possible that at least some of the reduction in the XRD peaks observed with increased milling time is due to the effective reduction in reflective volume resulting from the macroparticles being composed of microparticles. It is emphasized, however, that the exact mechanism or mechanisms responsible for the reduction in XRD peaks with milling is not essential.

SEM/EDS Microstructure Analysis of Mortar Samples

Figure 6:
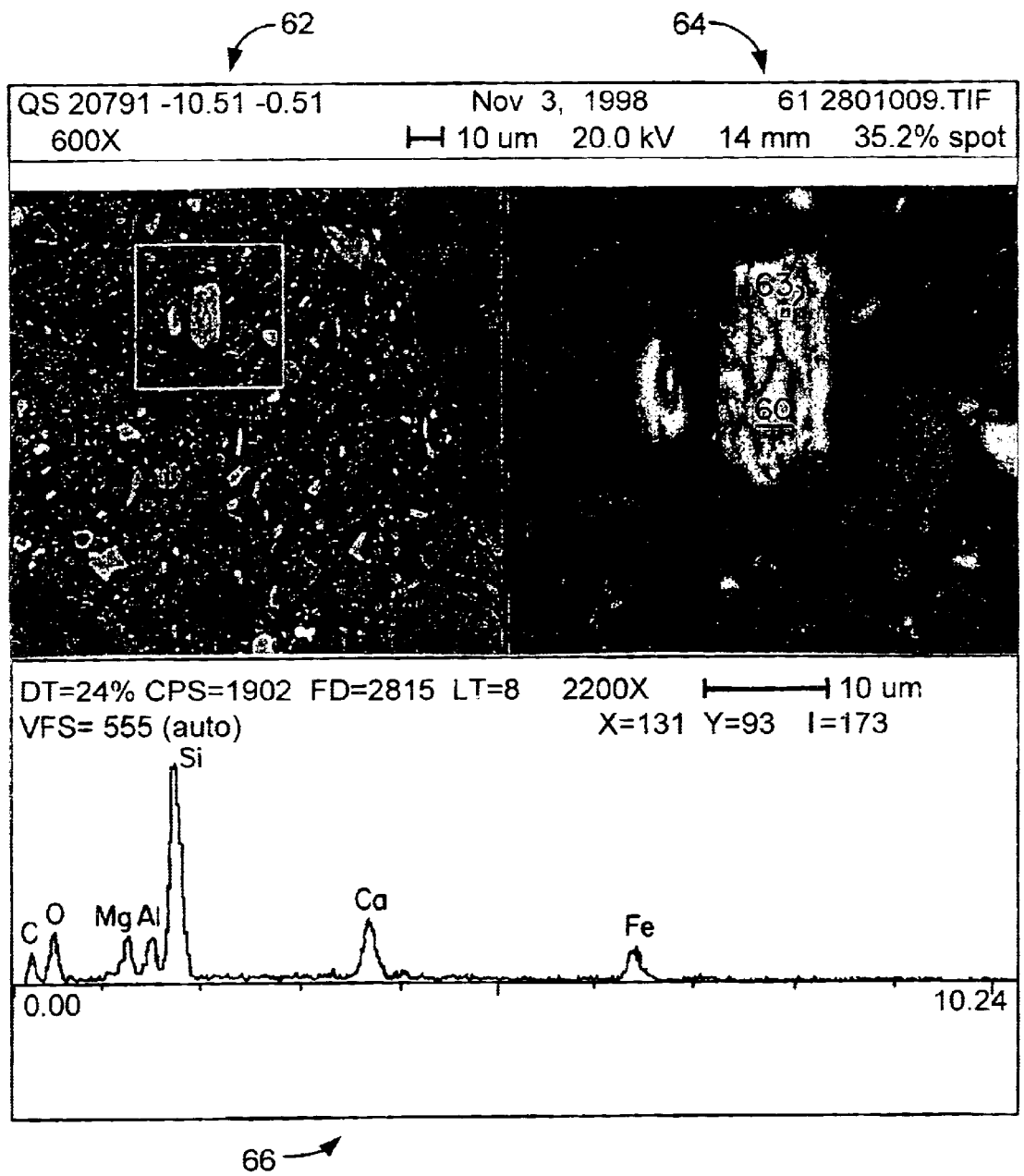
FIG. 6 is a set of scanning electron micrographs and an energy dispersive spectrum of a cured lime cube mixture including quarry fines that were milled for ten minutes.

FIG. 6 is a set of SEMs at 600X 62 and 2,200X 64, in addition to an EDS spectra 66 of the elemental composition of the material within the target square 68. The SEMs are of a prepared lime mortar sample containing fines milled for 10 minutes. The mortar includes sand 61, fines 60, and interstitial lime.

Figure 7:
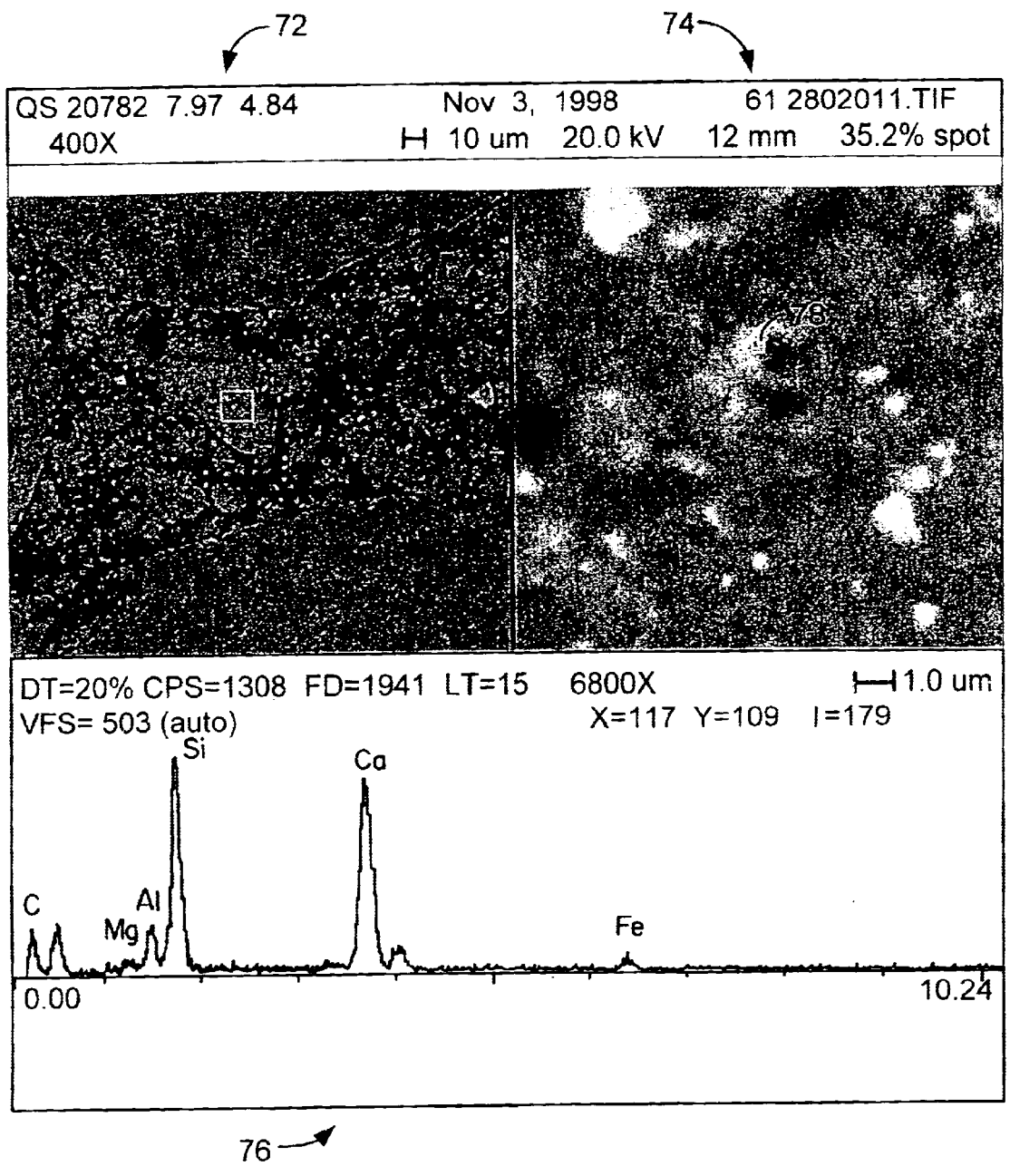
FIG. 7 is a set of scanning electron micrographs and an energy dispersive spectrum of a cured lime cube mixture including quarry fines that were milled for sixty minutes.

FIG. 7 is a set of SEMs at 400X 72 and 6,800X 74, in addition to an EDS spectra 76 of the elemental composition of the material within the target square 78. The SEMs are of a prepared lime mortar sample containing fines milled for about 60 minutes before mixing with lime, sand and water. While the particles of fines shown in FIG. 6 have relatively well defined surfaces or edges, the crystal-like particles of fines 70 shown in FIG. 7 have new surfaces or edges that appear to diffuse into the surrounding matrix. Additionally, comparing the EDS spectra of the sample of FIG. 6 with the sample of FIG. 7, it is seen that the calcium content within a fines particle has substantially increased. It is therefore believed that mechanical activation of granitic fines promotes the formation of hydrated calcium silicate, as with traditional pozzolans. Thus one could distinguish a lime, concrete, or mortar containing mechanically activated granitic fines from similar mixtures where the granitic fines were not mechanically activated by observing the microstructure.

While a full and complete description of the invention is set forth above, it is understood that various modifications and alternatives can be used without departing from the spirit of the invention. For example, while certain milling techniques have been identified, other milling techniques may be used to achieve similar results. In particular, while batch milling techniques have been used for evaluation purposes, continuous milling techniques may be applied in other instances. Similarly, additives may be added to the milling process, such as triethanolamine ("TEA"), shale, or clay to the concrete or mortar mixtures. Therefore, the scope of this invention should not be limited by the examples given above, but rather by the following claims.

What is claimed is:

1. A granitic pozzolan comprising mechanically activated particles wherein the particles have a size distribution wherein over 80% of the particles have a maximum dimension less than 1 micron.

2. The pozzolan of claim 1 wherein the particles are activated using high energy milling.

3. A pozzolan as in claim 1 wherein the pozzolan includes at least one material selected from the group consisting of feldspar, calcite, hornblende, plagioclase, pyroxene, and mica.

4. A pozzolan comprising activated particles derived from granitic materials, the pozzolan having a particle size distribution wherein over 80% of the particles in a sample population have a maximum dimension less than 1 micron, and wherein particles having a maximum dimension of about 10 microns comprise agglomerations of smaller particles.

5. A cement-based material comprising a Portland cement paste which includes activated granitic-based pozzolan in an amount sufficient to increase the strength of the cement-based material.

6. The cement-based material of claim 5 wherein the granitic-based pozzolan reacts with excess calcium hydroxide from cement hydration to form cementitious material.

7. The cement-based material of claim 6 comprising a portland cement paste which includes activated granitic-based pozzolan in an amount of about 20% by weight.

8. The cement-based material of claim 6 wherein a post-hydration calcium concentration in the granitic-based pozzolan is at least twice as high as a pre-hydration calcium concentration.

9. The cement-based material of claim 5 wherein the granitic-based pozzolan is chemically modified by the cement by transfer of calcium from the cement to the granitic-based pozzolan.

10. The cement-based material of claim 9 wherein a post-hydration calcium concentration in the granitic-based pozzolan is at least twice as high as a pre-hydration calcium concentration.

11. A method of converting granitic quarry fines into a pozzolan, the method comprising:

placing the granitic quarry fines into an attritor mill; and applying mechanical energy to the granitic quarry fines sufficient to chemically activate the granitic quarry fines.

12. The method of claim 11 wherein the mechanical energy is applied for a period of about forty minutes.

13. A method of forming a concrete structure, the method comprising:

mixing at least cement, water, and mechanically activated granitic quarry fines into a pourable mixture, the pourable mixture comprising at least about 20% by weight quarry fines; and pouring the pourable mixture into a form.

14. A granitic pozzolan which comprises mechanically activated quarry fines.

15. A pozzolan as in claim 14 wherein the pozzolan includes at least one material selected from the group consisting of feldspar, calcite, hornblende, plagioclase, pyroxene, and mica.

16. A granitic pozzolan comprising mechanically activated particles having a size distribution wherein over 80% of the particles have a maximum dimension less than 1 micron.

17. A cement-based material comprising a Portland cement paste which includes activated granitic-based pozzolan in an amount of at least about 20% by weight and wherein the pozzolan particles have a size distribution wherein over 80% of the particles have a maximum dimension less than 1 micron.

18. The cement-based material of claim 17 wherein the granitic-based pozzolan reacts with excess calcium hydroxide from cement hydration to form cementitious material.

19. The cement-based material of claim 18 wherein a post-hydration calcium concentration in the granitic-based pozzolan is at least twice as high as a pre-hydration calcium concentration.

20. The cement-based material of claim 17 wherein the granitic-based pozzolan is chemically modified by the cement by a transfer of calcium from the cement to the granitic-based pozzolan.

21. The cement-based material of claim 17 wherein a post-hydration calcium concentration in the granitic-based pozzolan is at least twice as high as a pre-hydration calcium concentration.

22. A method of converting granitic quarry fines into a pozzolan, the method comprising:

placing the granitic quarry fines into a mill; and applying mechanical energy to the granitic quarry fines sufficient to chemically activate the granitic quarry fines wherein the pozzolan has a size distribution wherein over 80% of the particles have a maximum dimension less than 1 micron.

23. The method of claim 22 wherein the mill comprises an attritor mill.

24. The method of claim 22 wherein the mechanical energy is applied for a period of about forty minutes.

25. A method as in claim 22 wherein the pozzolan made by the method further includes at least one material selected from the group consisting of feldspar, calcite, hornblende, plagioclase, pyroxene, and mica.

26. A method of forming a concrete structure, the method comprising:

mixing at least cement, water, and mechanically activated granitic quarry fines, the fines having a size distribution wherein over 80% of the particles have a maximum dimension less than 1 micron, into a pourable mixture, the pourable mixture comprising at least about 20% by weight quarry fines; and pouring the pourable mixture into a form.

* * * * *